(12) United States Patent
Yang

(10) Patent No.: US 10,110,648 B2
(45) Date of Patent: Oct. 23, 2018

(54) HEAD UNIT FOR PROVIDING MULTI-STREAMING SERVICE BETWEEN DIFFERENT DEVICES, STREAMING CONTROL METHOD THEREOF, AND COMPUTER READABLE MEDIUM FOR EXECUTING THE METHOD

(71) Applicant: HYUNDAI MOTOR COMPANY, Seoul (KR)

(72) Inventor: Woo Sok Yang, Gwangmyeong-si (KR)

(73) Assignee: HYUNDAI MOTOR COMPANAY, Seoul (KR)

( * ) Notice: Subject to any disclaimer, the term of this patent is extended or adjusted under 35 U.S.C. 154(b) by 203 days.

(21) Appl. No.: 14/727,545

(22) Filed: Jun. 1, 2015

(65) Prior Publication Data
US 2016/0173548 A1 Jun. 16, 2016

(30) Foreign Application Priority Data
Dec. 11, 2014 (KR) .................. 10-2014-0178284

(51) Int. Cl.
*H04L 29/06* (2006.01)
*H04L 29/08* (2006.01)

(52) U.S. Cl.
CPC .......... *H04L 65/4092* (2013.01); *H04L 67/04* (2013.01); *H04L 67/12* (2013.01); *H04L 67/2823* (2013.01); *H04L 67/42* (2013.01)

(58) Field of Classification Search
CPC ..... H04L 65/4092; H04L 67/04; H04L 67/12; H04L 67/2823; H04L 67/42
See application file for complete search history.

(56) References Cited

U.S. PATENT DOCUMENTS

| | | | | |
|---|---|---|---|---|
| 7,039,393 B1 * | 5/2006 | Kite | ...................... | H04M 1/642 455/412.1 |
| 7,987,487 B2 * | 7/2011 | Rackin | ................... | H04N 5/765 381/86 |

(Continued)

FOREIGN PATENT DOCUMENTS

| | | |
|---|---|---|
| JP | 2014-099840 A | 5/2014 |
| KR | 10-2010-0026811 A | 3/2010 |

(Continued)

OTHER PUBLICATIONS

Korean Notice of Allowance issued in Korean Application No. 10-2014-0178284 dated Sep. 28, 2016.

(Continued)

*Primary Examiner* — Blake J Rubin
(74) *Attorney, Agent, or Firm* — McDermott Will & Emery LLP

(57) ABSTRACT

A head unit for a vehicle, for providing a multi-streaming service between different devices is disclosed. The head unit includes a resource controller for permitting access of a plurality of mobile terminals and exclusively reproducing each resource so as to occupy only one content in each resource within a control range for each respective content of at least one content provided from a plurality of accessed mobile terminals. Thus, various mobile terminals (e.g. smartphones) are simultaneously connected and resources are exclusively used so as to enable a seamless multi-streaming service, thereby enhancing user convenience.

23 Claims, 4 Drawing Sheets

(56) References Cited

U.S. PATENT DOCUMENTS

| | | | |
|---|---|---|---|
| 8,705,527 B1* | 4/2014 | Addepalli | H04W 4/046 370/389 |
| 8,718,797 B1* | 5/2014 | Addepalli | H04W 4/046 700/17 |
| 9,340,155 B2* | 5/2016 | Pisz | B60H 1/00642 |
| 2003/0224840 A1 | 12/2003 | Frank et al. | |
| 2005/0266879 A1* | 12/2005 | Spaur | H04L 12/4625 455/556.2 |
| 2008/0253317 A1* | 10/2008 | Gercekci | H04W 4/00 370/328 |
| 2009/0172373 A1* | 7/2009 | Lopes | H04L 69/12 713/1 |
| 2010/0333146 A1* | 12/2010 | Pickney | B60R 11/0235 725/75 |
| 2011/0296471 A1* | 12/2011 | Nau | H04N 5/76 725/75 |
| 2012/0010805 A1* | 1/2012 | Wilkerson | G06Q 10/109 701/538 |
| 2012/0036297 A1* | 2/2012 | Choi | H04L 67/12 710/110 |
| 2013/0007288 A1* | 1/2013 | Olsen | H04L 65/1069 709/227 |
| 2013/0059538 A1* | 3/2013 | King, II | H04W 76/15 455/41.2 |
| 2013/0086518 A1* | 4/2013 | Park | H04L 67/12 715/808 |
| 2013/0106750 A1* | 5/2013 | Kurosawa | G06F 3/041 345/173 |
| 2013/0226369 A1* | 8/2013 | Yorio | G06F 17/00 701/1 |
| 2014/0064526 A1* | 3/2014 | Otto | H04S 5/00 381/300 |
| 2014/0066014 A1* | 3/2014 | Nicholson | H04W 12/08 455/411 |
| 2014/0068713 A1* | 3/2014 | Nicholson | H04W 12/06 726/3 |
| 2014/0106726 A1* | 4/2014 | Crosbie | H04W 4/046 455/418 |
| 2014/0120829 A1* | 5/2014 | Bhamidipati | H04N 21/42207 455/3.06 |
| 2014/0155110 A1* | 6/2014 | Park | H04M 1/6091 455/458 |
| 2014/0179274 A1* | 6/2014 | O'Meara | H04L 63/0281 455/411 |
| 2014/0309864 A1* | 10/2014 | Ricci | H04W 48/04 701/36 |
| 2014/0347433 A1* | 11/2014 | Kafle | H04L 65/1069 348/14.02 |
| 2015/0089092 A1* | 3/2015 | Voto | G06F 13/385 710/14 |
| 2015/0181644 A1* | 6/2015 | Ehrentraut | H04B 1/005 455/553.1 |
| 2015/0192426 A1* | 7/2015 | Foster | G01C 21/3629 715/765 |
| 2015/0201023 A1* | 7/2015 | Kotab | H04L 65/60 709/208 |
| 2015/0222680 A1* | 8/2015 | Grover | H04L 65/4084 709/204 |
| 2015/0234575 A1* | 8/2015 | Suk | G06F 3/04817 715/740 |
| 2015/0264529 A1* | 9/2015 | Cho | H04M 1/7253 455/456.6 |
| 2015/0358471 A1* | 12/2015 | Roth | B60K 37/00 455/417 |
| 2015/0359015 A1* | 12/2015 | Hrabak | H04W 4/80 709/227 |
| 2015/0382394 A1* | 12/2015 | Tiedje | H04W 24/08 370/216 |
| 2016/0028870 A1* | 1/2016 | Lee | H04M 1/72527 455/420 |
| 2016/0044519 A1* | 2/2016 | Bai | H04W 84/10 370/252 |
| 2016/0100018 A1* | 4/2016 | MacKenzie | H04W 4/025 709/224 |
| 2016/0105924 A1* | 4/2016 | Baek | H04W 4/008 455/41.2 |
| 2016/0126995 A1* | 5/2016 | Li | H04W 76/10 455/558 |
| 2016/0127529 A1* | 5/2016 | Kim | H04M 1/6075 455/418 |
| 2016/0150350 A1* | 5/2016 | Ingale | H04L 67/12 370/255 |
| 2016/0165031 A1* | 6/2016 | Gopinath | H04M 1/6091 455/569.2 |
| 2016/0232122 A1* | 8/2016 | Margabandu | G06F 13/00 |

FOREIGN PATENT DOCUMENTS

| | | |
|---|---|---|
| KR | 10-2012-0113642 A | 10/2012 |
| KR | 10-2013-0125112 A | 11/2013 |
| KR | 10-2013-0141039 A | 12/2013 |
| KR | 10-2014-0005561 A | 1/2014 |
| KR | 10-2014-0017831 A | 2/2014 |
| KR | 10-2014-0084456 A | 7/2014 |

OTHER PUBLICATIONS

Korean Office Action issued in Korean Application No. 10-2014-0178284 dated Aug. 27, 2015.

* cited by examiner

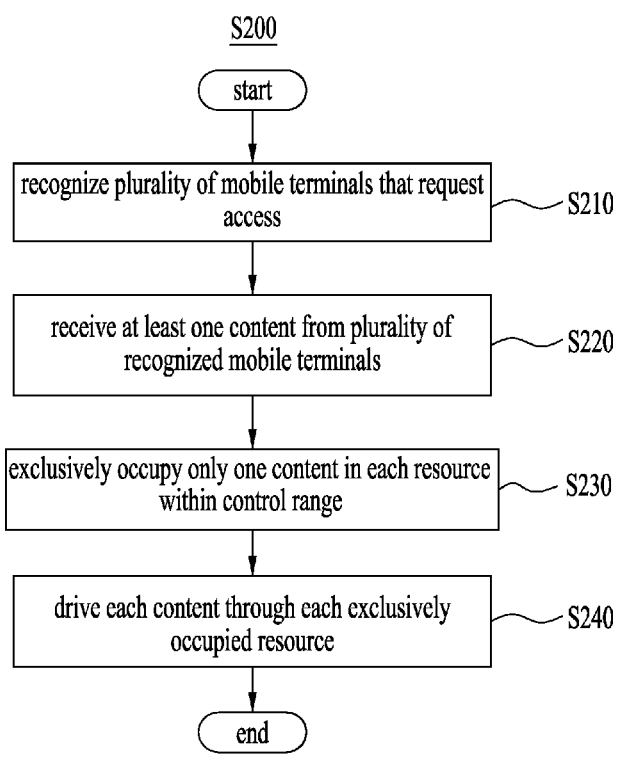

HEAD UNIT FOR PROVIDING MULTI-STREAMING SERVICE BETWEEN DIFFERENT DEVICES, STREAMING CONTROL METHOD THEREOF, AND COMPUTER READABLE MEDIUM FOR EXECUTING THE METHOD

CROSS-REFERENCE TO RELATED APPLICATION

This application claims the benefit of Korean Patent Application No. 10-2014-0178284, filed on Dec. 11, 2014 in the Korean Intellectual Property Office, the disclosure of which is hereby incorporated by reference as if fully set forth herein.

BACKGROUND OF THE INVENTION

Field of the Invention

The present invention relates to a head unit for providing a multi-streaming service between different devices, a streaming control method thereof, and a computer readable medium for executing the method, and more particularly, to a head unit for providing multi-streaming service via multiple access between different devices, a streaming control method thereof, and a computer readable medium for executing the method.

Discussion of the Related Art

Recently, a head unit has widely proliferated as a vehicle multimedia system. The head unit refers to a vehicle multimedia system obtained by integrating audio, video, and navigation.

The head unit provides an audio service such as a radio, a compact disc (CD), etc., a video service such as a digital versatile disc (DVD), etc., a navigation service such as a destination guidance function, and the like.

In addition, the above conventional head unit has gradually developed in functionality and has developed so as to improve driver convenience by adding a navigation function or adding various additional functions via linkage with a smartphone, etc. as well as an operation of simply checking or controlling performance of a vehicle.

For example, with regard to linkage between a conventional head unit and a smartphone, connectivity technology between a vehicle and a smartphone has developed, and a smartphone framework instead of simple application (app)-based technology such as CarPlay/GPM supports the connectivity technology.

In addition, app installed in a smartphone, that is, a smartphone operating system (OS) or framework (e.g. Android/iOS) is executed and linked with the conventional head unit so as to support a streaming service. However, problems arise in that the conventional head unit insufficiently responds to multiple smartphones and only technology for performing one corresponding technology is mainly developed.

That is, problems arise in that the conventional head unit is linked with one smartphone and provides one streaming service provided by a smartphone to insufficiently respond to multiple smartphones.

CITED REFERENCE

Patent Document (Patent Document 1) 1. Korean Patent Publication No. 2013-0005234, Published on Jan. 15, 2013, Title of Invention: Method for dynamically changing content displayed in vehicle head unit and mobile terminal therefor.

(Patent Document 2) 2. Korean Patent Publication No. 2012-0108763, Published on Oct. 5, 2012, Title of Invention: Head unit, terminal device, system, and method for vehicle.

SUMMARY OF THE INVENTION

Accordingly, the present invention is directed to a head unit for providing multi-streaming service between different devices, a streaming control method thereof, and a computer readable medium for executing the method that substantially obviate one or more problems due to limitations and disadvantages of the related art.

An object of the present invention is to provide a head unit for providing multi-streaming service between different devices, a streaming control method thereof, and a computer readable medium for executing the method, for simultaneously supporting streaming services (e.g. CarPlay and GPM) of a plurality of mobile terminals linked to a head unit and for providing a streaming service between different devices for seamless service conversion between mobile terminals.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the present invention has the following features.

In an aspect of the present invention, a head unit for a vehicle, for providing a multi-streaming service between different devices includes a resource controller for permitting access of a plurality of mobile terminals and exclusively reproducing each resource so as to occupy only one content in each resource within a control range for each respective content of at least one content provided from a plurality of accessed mobile terminals.

The resource controller may exclusively reproduce each resource including audio, video, and a microphone.

The resource controller may exclude an occupation entity of the plurality of mobile terminals and exclusively reproduce each resource when an occupation entity of each resource is the resource controller.

The resource controller may exclude an occupation entity of remaining mobile terminals except for the resource controller and a first mobile terminal of the plurality of mobile terminals and exclusively reproduce each resource when the occupation entity of each resource is the first mobile terminal.

The resource controller may determine whether content requested to be changed is the same type as content reproduced by a corresponding occupied resource upon receiving a request for change in the content from a mobile terminal, which does not occupy each resource, among the plurality of mobile terminals.

The resource controller may change the content of the corresponding occupied resource to the content requested to be changed and reproduce the corresponding resource under permission of an occupation entity upon determining that the content requested to be changed is the same type as the content reproduced by the corresponding occupied resource.

The resource controller may set the mobile terminal that requests change in content as an occupation entity after the change and exclude occupation entities of mobile terminals different from the resource controller.

The resource controller may notify a corresponding mobile terminal that the content requested to be changed is not the same as content reproduced by the corresponding occupied resource upon determining that the content requested to be changed is not the same as content reproduced by the corresponding occupied resource.

The head unit may further include a short-range communication module, wherein the short-range communication module may be connected to the plurality of mobile terminals via short-range communication.

In another aspect of the present invention, a streaming control method of a head unit for a vehicle, for providing a multi-streaming service between different devices includes permitting a plurality of mobile terminals to access via a short-range communication network, by a resource controller, receiving at least one content provided from the plurality of accessed mobile terminals, and exclusively reproducing each resource so as to occupy only one content in each resource within a control range for each respective content of at least one received content.

The exclusively reproducing may include exclusively reproducing each resource including audio, video, and a microphone by the resource controller.

The exclusively reproducing may include excluding an occupation entity of the plurality of mobile terminals and exclusively reproducing each resource by the resource controller when an occupation entity of each resource is the resource controller.

The exclusively reproducing may include excluding an occupation entity of remaining mobile terminals except for the resource controller and a first mobile terminal of the plurality of mobile terminals and exclusively reproducing each resource, by the resource controller when the occupation entity of each resource is the first mobile terminal.

The method may further include determining whether content requested to be changed is the same type as content reproduced by a corresponding occupied resource upon receiving a request for change in the content from a mobile terminal that does not occupy each resource among the plurality of mobile terminals, by the resource controller.

The determining may include changing the content of the corresponding occupied resource to the content requested to be changed and reproducing the corresponding resource under permission of an occupation entity upon determining that the content requested to be changed is the same type as the content reproduced by the corresponding occupied resource, by the resource controller.

The determining may include setting the mobile terminal that requests change in content as an occupation entity after the change and excluding occupation entities of mobile terminals different from the resource controller, by the resource controller.

The determining may include notifying a corresponding mobile terminal that the content requested to be changed is not the same as content reproduced by the corresponding occupied resource upon determining that the content requested to be changed is not the same as content reproduced by the corresponding occupied resource.

In another aspect of the present invention, a head unit for a vehicle, for providing a multi-streaming service between different devices includes a terminal recognition unit for recognizing a plurality of mobile terminals that request access via short-range communication, a resource receiver for receiving at least one content from the plurality of recognized mobile terminals, a resource controller for exclusively occupying only one content in each resource within a control range for each respective content of at least one content, and a content driver for driving each content through each exclusively occupied resource.

In another aspect of the present invention, a streaming control method of a head unit for a vehicle, for providing a multi-streaming service between different devices includes recognizing a plurality of mobile terminals requesting access via short-range communication, by a terminal recognition unit, receiving at least one content from the plurality of recognized mobile terminals, by a resource receiver, exclusively occupying only one content in each resource within a control range for each respective content of at least one content, by a resource controller, and driving each content through each exclusively occupied resource, by a content driver.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a flowchart of an example of a streaming control method of a head unit according to a fourth embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First Embodiment

Figure 1:
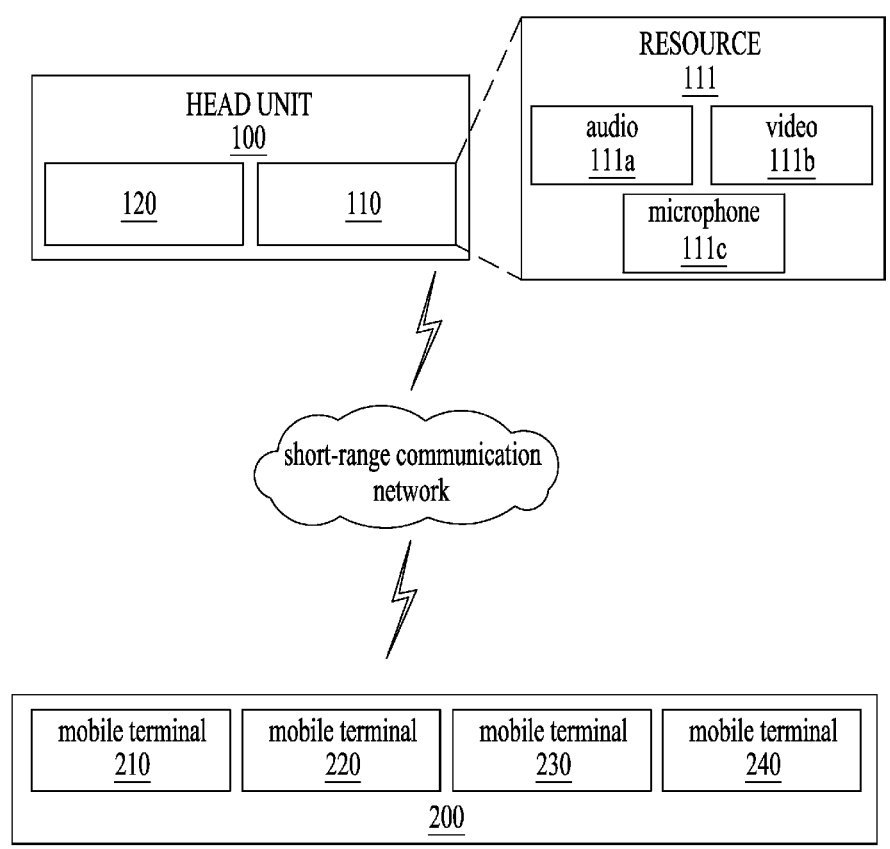
FIG. 1 is a diagram illustrating an example of a structure of a vehicle head unit according to a first embodiment of the present invention.

FIG. 1 is a diagram illustrating an example of a structure of a vehicle head unit 100 according to a first embodiment of the present invention.

Referring to FIG. 1, the vehicle head unit 100 according to the first embodiment of the present invention includes a resource controller 110 and a short-range communication controller 120.

First, the resource controller 110 according to the present invention receives an access request signal from a mobile terminal 200 when people in or around a vehicle transmit access requests using the mobile terminal 200 owned by the people in order to provide a multi-streaming service between different devices.

Then the resource controller 110 according to the present invention transmits an access permission signal to the mobile terminal 200 in response to the access request when a predetermined condition corresponding to the access request signal received from the mobile terminal 200 is satisfied. As such, a plurality of mobile terminals 200 may access the head unit 100 at last.

In this case, the predetermined condition may indicate a procedure for checking whether a user is pre-registered in the head unit 100 with respect to the plurality of mobile terminals 200 that request access or a procedure for manager permission of the head unit 100. However, needless to say, the present invention is not limited to the procedure and various conditions may be used. For example, the predetermined condition may be an authentication procedure.

However, preferably, when short-range communication, for example, Bluetooth access is achieved without a predetermined condition, the plurality of mobile terminals 200 that request access may access the resource controller 110 without any condition.

As such, when the plurality of mobile terminals 200 is accessed, the resource controller 110 according to the present invention receives at least one contents provided from the plurality of accessed mobile terminals 200. In this case, the at least one received content refers to audio, video, and information desired to be reproduced by a resource 111 operating as hardware such as a microphone.

Thus, the resource controller 110 according to the present invention controls at least one content and each resource 111 to occupy only one content in each resource 111 within a control range for each respective content of the at least one received content.

Preferably, the resource controller 110 according to the present invention exclusively controls the at least one received content so as to occupy the at least one received content by one resource 111 of the same type.

For example, when the resource 111 is audio, the resource controller 110 may exclusively control audio streaming content so as to occupy audio streaming content of the at least one received content by an audio resource 111a.

When the resource 111 is video, the resource controller 110 may exclusively control video streaming content so as to occupy video streaming content of the at least one received content by a video resource 111b.

In addition, when the resource 111 is a microphone, the resource controller 110 may exclusively control voice streaming content so as to occupy voice content associated with voice input from the mobile terminal 200 by a microphone resource 111c.

In this case, the expression "exclusively control" refers to exclusion of occupation entities of the plurality of mobile terminals 200 when an occupation entity of each resource 111 is the resource controller 110.

For example, when audio streaming content selected by the head unit 100 but not the mobile terminal 200 is first occupied by the audio resource 111a, the resource controller 110 may prevent the audio streaming content of the plurality of mobile terminals 200 that transmit the audio streaming content from being transmitted so as to prevent the plurality of mobile terminals 200 from being occupied by the audio resource 111a.

Likewise, the resource controller 110 according to the present invention may exclude occupation entities of the remaining mobile terminals 220 except for the resource controller 110 and the first mobile terminal 210 when an occupation entity of each resource 111 is the first mobile terminal 210 among the plurality of the mobile terminals 200.

In other words, the resource controller 110 may consider the first mobile terminal 210 that occupies the resource 111 as an occupation entity and exclude content transmitted from the remaining entities except for the first mobile terminal 210, for example, the resource controller 110 and the remaining mobile terminals 220 so as to occupy the resource 111 only by the first mobile terminal 210.

As such, the resource controller 110 according to the present invention may perform control to simultaneously reproduce at least one content of different types, transmitted from the plurality of mobile terminals 200, and simultaneously to reproduce only one content of the same type by each resource 111.

However, content reproduced by each resource 111 is not occupied by each resource 111 forever. That is, upon receiving a request for change in content from a mobile terminal 230 that does not occupy the resource 111 among the plurality of mobile terminals 200, the resource controller 110 according to the present invention may determine whether the content requested to be changed is the same type as content reproduced by the corresponding occupied resource 111.

For example, as the determination result, when the content requested to be changed is the same type as content reproduced by the corresponding occupied resource 111, the resource controller 110 according to the present invention may change content of the corresponding occupied resource 111 to content requested to be changed under the permission of an occupation entity, for example, the permission of the first mobile terminal 210 or the resource controller 110. In this case, needless to say, the content requested to be changed may be the same type as content prior to the change.

Likewise, when the content requested to be changed may be reproduced through the corresponding resource 111, the resource controller 110 according to the present invention sets the mobile terminal 230 that requests change in content as an occupation entity after the change and excludes occupation entities of mobile terminals 240 different from the resource controller 110, as described above.

However, upon determining that the content requested to be changed is not the same as content reproduced by the corresponding occupied resource 111, the resource controller 110 according to the present invention may notify the corresponding mobile terminal 240 that the content requested to be changed is not the same as content reproduced by the corresponding occupied resource 111. Thus, the corresponding mobile terminal 240 may transmit content that is not the same type as the content owned the mobile terminal 240 to the resource controller 110 so as to reproduce the transmitted content.

The resource controller 110 according to the present invention may be a multi-microprocessor that can control the plurality of mobile terminals 240 and the resource 111 and store data, in addition to performing the above processing. However, needless to say, the present invention is not limited thereto and the resource controller 110 performs generally and widely known basic processing.

Lastly, the short-range communication controller 110 according to the present invention supports a short-range communication interface between the head unit 100 and the plurality of mobile terminals 200. In this case, the short-range communication may allow data between devices within a short-range to be wirelessly transmitted and received with a predetermined format and frequency band, such as a local area network (LAN), an ultra wideband (UWB), Bluetooth, ZigBee, etc. However, the short-range communication applied to the present invention is preferably Bluetooth communication.

Second Embodiment

Figure 2:
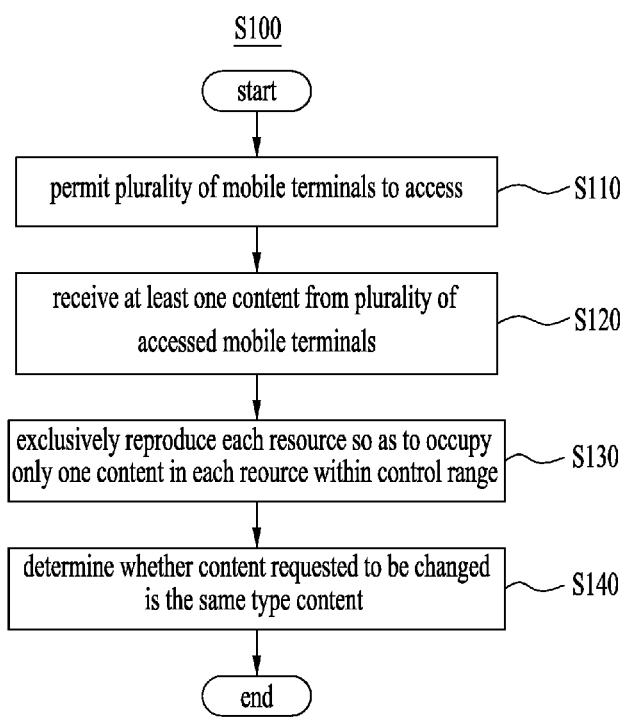
FIG. 2 is a flowchart of an example of a streaming control method of a vehicle head unit according to a second embodiment of the present invention.

FIG. 2 is a flowchart of an example of a streaming control method S100 of the vehicle head unit 100 of FIG. 1 according to a second embodiment of the present invention.

Referring to FIG. 2, the streaming control method S100 of the vehicle head unit 100 according to the second embodiment of the present invention may include operations S110 to S140 in order to provide a multi streamlining service between different devices, for example, the mobile terminals 200.

First, in operation S110 according to the present invention, the resource controller 110 according to the present invention receives an access request signal from the mobile terminal 200 when people in or around a vehicle transmit an access request to the head unit 100 using a mobile terminal 200 owned by the people.

Then in operation S110 according to the present invention, the resource controller 110 transmits an access permission signal to the mobile terminal 200 in response to the received access request upon determining that a predetermined condition corresponding to the access request signal received from the mobile terminal 200 is satisfied. As such, the plurality of mobile terminals 200 may access the head unit 100 at last.

In this case, the predetermined condition may indicate a procedure for checking whether a user is pre-registered in the head unit 100 with respect to the plurality of mobile terminals 200 that request access or a procedure for manager permission of the head unit 100. However, needless to say, the present invention is not limited to the procedure and various conditions may be used. For example, the predetermined condition may be an authentication procedure.

However, preferably, when short-range communication, for example, Bluetooth access is achieved without a predetermined condition, the plurality of mobile terminals 200 that request access may access the resource controller 110 without any condition.

Then, in operation S120 according to the present invention, when the plurality of mobile terminals 200 is permitted to access in the aforementioned operation S110, the resource controller 110 receives at least one content provided from the plurality of accessed mobile terminals 200. In this case, the at least one received content refers to audio, video, and information desired to be reproduced by a resource 111 operating as hardware such as a microphone.

Then, in operation S130 according to the present invention, the resource controller 110 controls at least one content and each resource 111 to occupy only one content in each resource 111 within a control range for each respective content of the at least one received content.

Preferably, the resource controller 110 according to the present invention exclusively controls the at least one received content and/or the corresponding resource 111 so as to occupy the at least one received content by one resource 111 of the same type.

For example, when the resource 111 is audio, the resource controller 110 may exclusively control audio streaming content so as to occupy audio streaming content of the at least one received content by an audio resource 111a.

When the resource 111 is video, the resource controller 110 may exclusively control video streaming content so as to occupy video streaming content of the at least one received content by a video resource 111b.

In addition, when the resource 111 is a microphone, the resource controller 110 may exclusively control voice streaming content so as to occupy voice content associated with voice input from the mobile terminal 200 by a microphone resource 111c.

In this case, the expression "exclusively control" refers to exclusion of occupation entities of the plurality of mobile terminals 200 when an occupation entity of each resource 111 is the resource controller 110.

For example, when audio streaming content selected by the head unit 100 but not the mobile terminal 200 is first occupied by the audio resource 111a, the resource controller 110 may prevent the audio streaming content of the plurality of mobile terminals 200 that transmit the audio streaming content from being transmitted so as to prevent the plurality of mobile terminals 200 from being occupied by the audio resource 111a.

Likewise, in operation 5130 according to the present invention, the resource controller 110 may exclude occupation entities of the remaining mobile terminals 220 except for the resource controller 110 and the first mobile terminal 210 when an occupation entity of each resource 111 is the first mobile terminal 210 among the plurality of the mobile terminals 200.

In other words, the resource controller 110 may consider the first mobile terminal 210 that occupies the resource 111 as an occupation entity and exclude content transmitted from the remaining entities except for the first mobile terminal 210, for example, the resource controller 110 and the remaining mobile terminals 220 so as to occupy the resource 111 only by the first mobile terminal 210.

As such, in operation S130 according to the present invention, the resource controller 110 according to the present invention may perform control to simultaneously reproduce at least one content of different types, transmitted from the plurality of mobile terminals 200, and simultaneously to reproduce only one content of the same type by each resource 111.

However, content reproduced by each resource 111 is not occupied by each resource 111 forever.

That is, in operation S140 according to the present invention, upon receiving a request for change in content from a mobile terminal 230 that does not occupy the resource 111 among the plurality of mobile terminals 200, the resource controller 110 according to the present invention may determine whether the content requested to be changed is the same type as content reproduced by the corresponding occupied resource 111.

For example, in operation S140 according to the present invention, as the determination result, when the content requested to be changed is the same type as content reproduced by the corresponding occupied resource 111, the resource controller 110 according to the present invention may change content of the corresponding occupied resource 111 to content requested to be changed under the permission of an occupation entity, for example, the permission of the first mobile terminal 210 or the resource controller 110.

In this case, needless to say, the content requested to be changed may be the same type as content prior to the change.

Likewise, when the content requested to be changed may be reproduced through the corresponding resource 111, the resource controller 110 according to the present invention sets the mobile terminal 230 that requests change in content as an occupation entity after the change and excludes occupation entities of mobile terminals 240 different from the resource controller 110, as described above.

However, on the other hand, upon determining that the content requested to be changed is not the same as content reproduced by the corresponding occupied resource 111, the resource controller 110 according to the present invention may notify the corresponding mobile terminal 240 that the content requested to be changed is not the same as content reproduced by the corresponding occupied resource 111. Thus, the corresponding mobile terminal 240 may transmit content that is not the same type as the content of the mobile terminal 240 to the resource controller 110 so as to reproduce the transmitted content.

Third Embodiment

Figure 3:
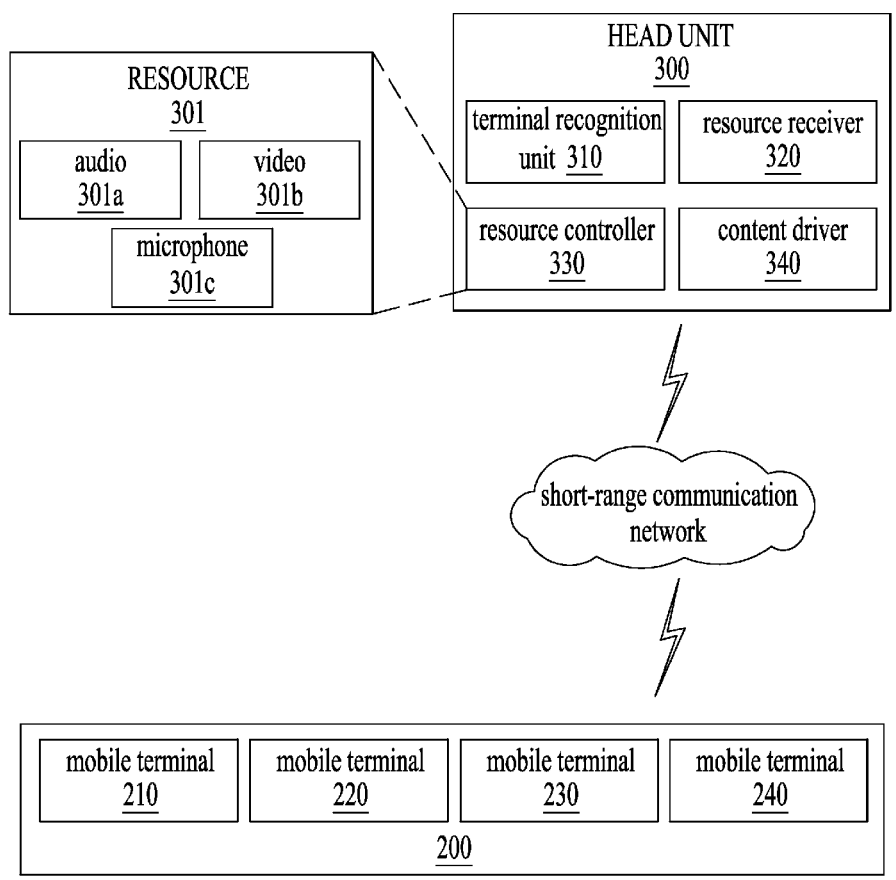
FIG. 3 is a diagram illustrating an example of a vehicle head unit according to a third embodiment of the present invention.

FIG. 3 is a diagram illustrating an example of a vehicle head unit 300 according to a third embodiment of the present invention.

Referring to FIG. 3, the vehicle head unit 300 according to the third embodiment of the present invention includes a terminal recognition unit 310, a resource receiver 320, a resource controller 330, and a content driver 340 in order to provide a multi-streaming service between different devices.

First, the terminal recognition unit 310 according to the present invention recognizes a plurality of mobile terminals 200 that request access via short-range communication. In this case, a recognition condition may indicate a procedure for checking whether a user is pre-registered in the head unit 300 with respect to the plurality of mobile terminals 200 that request access or a procedure for manager permission of the head unit 300. However, needless to say, the present invention is not limited to the procedure and various conditions may be used. For example, the recognition condition may be an authentication procedure.

However, preferably, when short-range communication, for example, Bluetooth access is achieved without a predetermined condition, the terminal recognition unit 310 may recognize the plurality of mobile terminals 200 that request access, without any condition.

The mobile terminal 200 and the head unit 300 may be connected via a short-range communication network. For example, a representative example may be the short-range communication network for allowing data between devices within a short-range to be wirelessly transmitted and received with a predetermined format and frequency band, such as a local area network (LAN), an ultra wideband (UWB), Bluetooth, Zigbee, etc. Among these, preferably, the plurality of mobile terminals 200 and the head unit 300 may be connected via Bluetooth communication.

Then the resource receiver 320 according to the present invention receives at least one content from the plurality of mobile terminals 200 recognized by the terminal recognition unit 310. In this case, the at least one received content refers to audio, video, and information desired to be reproduced by a resource 301 operating as hardware such as a microphone.

Then the resource controller 330 according to the present invention controls at least one content and each resource 301 to occupy only one content in each resource 301 within a control range for each respective content of the aforementioned at least one content received by the resource receiver 320.

Preferably, the resource controller 330 according to the present invention exclusively controls the at least one received content so as to occupy the at least one received content by one resource 301 of the same type.

For example, when the resource 301 is audio, the resource controller 330 may exclusively control audio streaming content so as to occupy audio streaming content of the at least one received content by an audio resource 301a.

When the resource 301 is video, the resource controller 330 may exclusively control video streaming content so as to occupy video streaming content of the at least one received content by a video resource 301b.

In addition, when the resource 301 is a microphone, the resource controller 330 may exclusively control voice streaming content so as to occupy voice content associated with voice input from the mobile terminal 200 by a microphone resource 301c.

In this case, the expression "exclusively control" refers to exclusion of occupation entities of the plurality of mobile terminals 200 when an occupation entity of each resource 301 is the head unit 300.

For example, when audio streaming content selected by the head unit 300 but not the mobile terminal 200 is first occupied by the audio resource 301a, the resource controller 330 may prevent the audio streaming content of the plurality of mobile terminals 200 that transmit the audio streaming content from being transmitted so as to prevent the plurality of mobile terminals 200 from being occupied by the audio resource 301a.

Likewise, the resource controller 330 according to the present invention may exclude occupation entities of the remaining mobile terminals 220 except for the head unit 300 and the first mobile terminal 210 when an occupation entity of each resource 301 is the first mobile terminal 210 among the plurality of mobile terminals 200.

In other words, the resource controller 330 may consider the first mobile terminal 210 that occupies the first mobile terminal 210 that occupies the resource 301 as an occupation entity and exclude content transmitted from the remaining entities except for the first mobile terminal 210, for example, the head unit 300 and the remaining mobile terminals 220 so as to exclusively occupy the corresponding resource 301 only by the first mobile terminal 210.

Lastly, the content driver 340 according to the present invention drives (reproduces) each content through each resource 301 that is exclusively occupied by the aforementioned resource controller 330.

However, content reproduced by each resource 301 is not occupied by each resource 301 forever. That is, upon receiving a request for change in content from the mobile terminal 230 that does not occupy the resource 301 among the plurality of mobile terminals 200, the content driver 340 according to the present invention may determine whether the content requested to be changed is the same type as content reproduced by the corresponding occupied resource 301.

For example, as the determination result, when the content requested to be changed is the same type as content reproduced by the corresponding occupied resource 301, the content driver 340 according to the present invention may change content of the corresponding occupied resource 301 to content requested to be changed under the permission of an occupation entity, for example, the permission of the first mobile terminal 210 or the head unit 300. In this case, needless to say, the content requested to be changed may be the same type as content prior to the change.

Likewise, when the content requested to be changed may be reproduced through the corresponding resource 301, the resource controller 330 according to the present invention sets the mobile terminal 230 that requests change in content as an occupation entity after the change and excludes occupation entities of the mobile terminals 240 different from the resource controller 330, as described above.

However, upon determining that the content requested to be changed is not the same as content reproduced by the corresponding occupied resource 301, the content driver 340 according to the present invention may notify the corresponding mobile terminal 240 that the content requested to be changed is not the same as content reproduced by the corresponding occupied resource 301. Accordingly, the corresponding mobile terminal 240 may transmit content that is not the same type as the content owned by the mobile terminal 240 to the content driver 340 so as to reproduce the transmitted content.

As such, according to the third embodiment of the present invention, at least one content of different types, transmitted from the plurality of mobile terminals 200, may be simultaneously driven (reproduced) by the head unit 300 and simultaneously only one content of the same type may be reproduced by each resource 301, and thus it may be advantageous in that the number of connecting conditions of the mobile terminal 200 can be minimized and the plurality of mobile terminals 200 can be simultaneously used, thereby achieving a flexible streaming service between the mobile terminals 200 via the head unit 300.

Fourth Embodiment

FIG. 4 is a flowchart of an example of a streaming control method S200 of the head unit 300 according to a fourth embodiment of the present invention.

Referring to FIG. 4, the streaming control method S200 of the head unit 300 according to the fourth embodiment of the present invention includes operations S210 to S240 in order to provide a multi streamlining service between different devices, for example, the mobile terminals 200.

First, in operation S210 according to the present invention, the terminal recognition unit 310 according to the present invention recognizes the plurality of mobile terminals 200 that request access via short-range communication. In this case, a recognition condition may indicate a procedure for checking whether a user is pre-registered in the head unit 300 with respect to the plurality of mobile terminals 200 that request access or a procedure for manager permission of the head unit 300. However, needless to say, the present invention is not limited to the procedure and various conditions may be used. For example, the recognition condition may be an authentication procedure.

However, preferably, when short-range communication, for example, Bluetooth access is achieved without a predetermined condition, the terminal recognition unit 310 may recognize the plurality of mobile terminals 200 that request access, without any condition.

Then, in operation S220 according to the present invention, the resource receiver 320 receives at least one content from the plurality of mobile terminals 200 recognized in the aforementioned operation S210. In this case, the at least one received content refers to audio, video, and information desired to be reproduced by a resource 301 operating as hardware such as a microphone.

Then, in operation S230 according to the present invention, the resource controller 330 controls at least one content and each resource 301 to occupy only one content in each resource 301 within a control range for each respective content of the aforementioned at least one content received in the aforementioned S320.

Preferably, in operation S230 according to the present invention, the resource controller 330 exclusively controls the at least one content received in operation S320 so as to occupy the at least one received content by one resource 301 of the same type.

For example, when the resource 301 is audio, the resource controller 330 may exclusively control audio streaming content so as to occupy audio streaming content of the at least one received content by the audio resource 301a.

When the resource 301 is video, the resource controller 330 may exclusively control video streaming content so as to occupy video streaming content of the at least one received content by the video resource 301b.

In addition, when the resource 301 is a microphone, the resource controller 330 may exclusively control voice streaming content so as to occupy voice content associated with voice input from the mobile terminal 200 by the microphone resource 301c.

In this case, the expression "exclusively control" refers to exclusion of occupation entities of the plurality of mobile terminals 200 when an occupation entity of each resource 301 is the head unit 300.

For example, when audio streaming content selected by the head unit 300 but not the mobile terminal 200 is first occupied by the audio resource 301a, the resource controller 330 may prevent the audio streaming content of the plurality of mobile terminals 200 that transmit the audio streaming content from being transmitted so as to prevent the plurality of mobile terminals 200 from being occupied by the audio resource 301a.

Likewise, in operation S330 according to the present invention, the resource controller 330 may exclude occupation entities of the remaining mobile terminals 220 except for the head unit 300 and the first mobile terminal 210 when an occupation entity of each resource 301 is the first mobile terminal 210 among the plurality of mobile terminals 200.

In other words, the resource controller 330 may consider the first mobile terminal 210 that occupies the first mobile terminal 210 that occupies the resource 301 as an occupation entity and exclude content transmitted from the remaining entities except for the first mobile terminal 210, for example, the head unit 300 and the remaining mobile terminals 220 so as to exclusively occupy the corresponding resource 301 only by the first mobile terminal 210.

Lastly, in operation S340 according to the present invention, the content driver 340 drives (reproduces) each content through each resource 301 that is exclusively occupied in the aforementioned operation S230.

However, content reproduced by each resource 301 is not reproduced via occupation of a specific resource 301 forever. That is, in operation S340 according to the present invention, upon receiving a request for change in content from the mobile terminal 230 that does not occupy the resource 301 among the plurality of mobile terminals 200, the content driver 340 may determine whether the content requested to be changed is the same type as content reproduced by the corresponding occupied resource 301.

For example, as the determination result, when the content requested to be changed is the same type as content reproduced by the corresponding occupied resource 301, the content driver 340 may change content of the corresponding occupied resource 301 to content requested to be changed under the permission of an occupation entity, for example, the permission of the first mobile terminal 210 or the head unit 300. In this case, needless to say, the content requested to be changed may be the same type as content prior to the change.

Likewise, when the content requested to be changed may be reproduced through the corresponding resource 301, in operation S330 according to the present invention, the resource controller 330 sets the mobile terminal 230 that requests change in content as an occupation entity after the change and excludes occupation entities of the mobile terminals 240 different from the resource controller 330, as described above.

However, upon determining that the content requested to be changed is not the same as content reproduced by the corresponding occupied resource 301, the content driver 340 may notify the corresponding mobile terminal 240 that the content requested to be changed is not the same as content reproduced by the corresponding occupied resource 301. Accordingly, the corresponding mobile terminal 240 may transmit content that is not the same type as the content owned by the mobile terminal 240 to the content driver 340 so as to reproduce the transmitted content.

As such, according to the fourth embodiment of the present invention, at least one content of different types, transmitted from the plurality of mobile terminals 200, may be simultaneously driven (reproduced) by the head unit 300 and simultaneously only one content of the same type may be reproduced by each resource 301, and thus it may be advantageous in that a connection condition of the mobile terminal 200 can be minimized and the plurality of mobile terminals 200 can be simultaneously used, thereby achieving a flexible streaming service between the mobile terminals 200 via the head unit 300.

As described above, according to the present invention, various mobile terminals (e.g. smartphones) are simultaneously connected and resources are exclusively used so as to enable a seamless multi-streaming service, thereby enhancing user convenience.

According to the present invention, the connected mobile terminals recognize the other mobile terminal as a head unit, notify a mobile terminal B and the head unit that a mobile terminal A occupies a resource when the mobile terminal A occupies the resource during resource occupation, and notify the mobile terminal A and the mobile terminal B that a head unit occupies a resource when the head unit occupies the resource so as to occupy one resource by one of a mobile terminal and a head unit, thereby seamlessly enhancing user convenience.

For example, a father, a mother, a son, and a daughter get in a car and connect their smartphones to a head unit in order to prepare their family travel. In this case, the smartphones are simultaneously connected to the head unit via a combination application program such as CarPlay & CarPlay, GPM & GPM, CarPlay & GPM, etc.

When a navigation player and music are driven by the father's smartphone during vehicle movement, the daughter wants to reproduce a latest music stored in the daughter's smartphone and requests audio change (focus change) to the head unit.

Thus, the navigation player is driven by the father's smartphone and the latest music is driven by the daughter's smartphone, and then the head unit simultaneously reproduces the two functions so as to satisfy all family members.

As such, the navigation player can be continuously operated without disconnection of the father's smartphone and the music can be converted directly through the daughter's smartphone. Around their destination, the mother finds out information about surroundings of the destination through the mother's smartphone and wants to go to the corresponding point.

In this case, when content change request (focus change request) is transmitted to the head unit from the mother's smartphone, the navigation player operated by the father's smartphone may be streamed to the mother's smartphone.

Information can be retrieved in the mother's smartphone and the current navigation player can be converted to a corresponding navigation without setting of destination by the father's smartphone. As such, a seamless multi-streaming service is possible.

Embodiments of the present invention can include a computer readable medium including program commands for executing operations implemented through various computers. The computer readable medium can store program commands, data files, data structures or combinations thereof. The program commands recorded in the medium may be specially designed and configured for the present invention or be known to those skilled in the field of computer software. Examples of a computer readable recording medium include magnetic media such as hard discs, floppy discs and magnetic tapes, optical media such as CD-ROMs and DVDs, magneto-optical media such as floptical discs, or hardware devices such as ROMs, RAMs and flash memories, which are specially configured to store and execute program commands. Examples of the program commands include a machine language code created by a compiler and a high-level language code executable by a computer using an interpreter and the like. The hardware device may be configured as one or more software modules in order to perform processing according to the present invention, and vice versa.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A head unit for a vehicle, for providing a multi-streaming service between different devices, the head unit comprising a resource controller for
   permitting access of a plurality of mobile terminals including separate first and second mobile terminals,
   exclusively reproducing each resource so as to occupy only one content in each resource within a control range for each respective content of at least one content provided from a plurality of accessed mobile terminals,
   performing control simultaneously to reproduce one content of first type, transmitted from the first mobile terminal, by first resource, while another content of second type, transmitted from the second mobile terminal, is reproduced by second resource,
   simultaneously streaming different content types from different mobile terminals concurrently,
   determining whether content requested to be changed is the same type as content reproduced by a corresponding occupied resource of one of the first mobile terminal and the second mobile terminal upon receiving a request for change in the content from a third mobile terminal, which does not occupy each resource, among the plurality of mobile terminals,
   changing the content of the corresponding occupied resource to the content requested to be changed and reproduces the corresponding resource under permission of an occupation entity upon determining that the content requested to be changed is the same type as the content reproduced by the corresponding occupied resource,
   setting the mobile terminal that requests change in content as an occupation entity after the change and excludes occupation entities of mobile terminals different from the resource controller,
   wherein a streaming service of the content of the corresponding occupied resource is seamlessly converted to the content requested to be changed of the third mobile terminal,
   wherein the head unit permitting access of a plurality of mobile terminals, when a predetermined condition corresponding to an access request signal received from each of the plurality of mobile terminals is satisfied, and wherein the predetermined condition is a procedure for checking whether the mobile terminal is pre-registered in the head unit.

2. The head unit according to claim 1, wherein the resource controller exclusively reproduces each resource comprising audio, video, and a microphone.

3. The head unit according to claim 2, wherein the resource controller excludes an occupation entity of the plurality of mobile terminals and exclusively reproduces each resource when an occupation entity of each resource is the resource controller.

4. The head unit according to claim 3, wherein the resource controller excludes an occupation entity of remaining mobile terminals except for the resource controller and a first mobile terminal of the plurality of mobile terminals and exclusively reproduces each resource when the occupation entity of each resource is the first mobile terminal.

5. The head unit according to claim 1, wherein the resource controller notifies a corresponding mobile terminal that the content requested to be changed is not the same as content reproduced by the corresponding occupied resource upon determining that the content requested to be changed is not the same as content reproduced by the corresponding occupied resource.

6. The head unit according to claim 1, further comprising a short-range communication module, wherein the short-range communication module is connected to the plurality of mobile terminals via short-range communication.

7. A streaming control method of a head unit for a vehicle, for providing a multi-streaming service between different devices, the method comprising:

permitting a plurality of mobile terminals including separate first and second mobile terminals to access via a short-range communication network, by a resource controller;

receiving at least one content provided from the plurality of accessed mobile terminals;

exclusively reproducing each resource so as to occupy only one content in each resource within a control range for each respective content of at least one received content, performing control simultaneously to reproduce one content of first type, transmitted from the first mobile terminal, by first resource, while another content of second type, transmitted from the second mobile terminal, is reproduced by second resource, simultaneously streaming different content types from different mobile terminals concurrently, wherein the resource controller determines whether content requested to be changed is the same type as content reproduced by a corresponding occupied resource of one of the first mobile terminal and the second mobile terminal upon receiving a request for change in the content from a third mobile terminal, which does not occupy each resource, among the plurality of mobile terminals, changes the content of the corresponding occupied resource to the content requested to be changed and reproduces the corresponding resource under permission of an occupation entity upon determining that the content requested to be changed is the same type as the content reproduced by the corresponding occupied resource, sets the mobile terminal that requests change in content as an occupation entity after the change and excludes occupation entities of mobile terminals different from the resource controller, wherein a streaming service of the content of the corresponding occupied resource is seamlessly converted to the content requested to be changed of the third mobile terminal, wherein the head unit permitting access of a plurality of mobile terminals, when a predetermined condition corresponding to an access request signal received from each of the plurality of mobile terminals is satisfied, and wherein the predetermined condition is a procedure for checking whether the mobile terminal is pre-registered in the head unit.

8. The method according to claim 7, wherein the exclusively reproducing comprises exclusively reproducing each resource comprising audio, video, and a microphone by the resource controller.

9. The method according to claim 8, wherein the exclusively reproducing comprises excluding an occupation entity of the plurality of mobile terminals and exclusively reproducing each resource by the resource controller when an occupation entity of each resource is the resource controller.

10. The method according to claim 9, wherein the exclusively reproducing comprises excluding an occupation entity of remaining mobile terminals except for the resource controller and a first mobile terminal of the plurality of mobile terminals and exclusively reproducing each resource, by the resource controller when the occupation entity of each resource is the first mobile terminal.

11. The method according to claim 7, wherein the determining comprises notifying a corresponding mobile terminal that the content requested to be changed is not the same as content reproduced by the corresponding occupied resource upon determining that the content requested to be changed is not the same as content reproduced by the corresponding occupied resource.

12. A non-transitory computer readable medium for executing the streaming control method according to claim 7.

13. A head unit for a vehicle, for providing a multi-streaming service between different devices, the head unit comprising:

a terminal recognition unit for recognizing a plurality of mobile terminals including separate first and second mobile terminals that request access via short-range communication;

a resource receiver for receiving at least one content from the plurality of recognized mobile terminals;

a resource controller for exclusively occupying only one content in each resource within a control range for each respective content of at least one content; and a content driver for driving each content through each exclusively occupied resource, wherein the resource controller performs control simultaneously to reproduce one content of first type, transmitted from the first mobile terminal, by first resource, while another content of second type, transmitted from the second mobile terminal, is reproduced by second resource, simultaneously streams different content types from different mobile terminals concurrently, determines whether content requested to be changed is the same type as content reproduced by a corresponding occupied resource of one of the first mobile terminal and the second mobile terminal upon receiving a request for change in the content from a third mobile terminal, which does not occupy each resource, among the plurality of mobile terminals, changes the content of the corresponding occupied resource to the content requested to be changed and reproduces the corresponding resource under permission of an occupation entity upon determining that the content requested to be changed is the same type as the content reproduced by the corresponding occupied resource, and sets the mobile terminal that requests change in content as an occupation entity after the change and excludes occupation entities of mobile terminals different from the resource controller, wherein a streaming service of the content of the corresponding occupied resource is seamlessly converted to the content requested to be changed of the third mobile terminal, wherein the head unit permitting access of a plurality of mobile terminals, when a predetermined condition corresponding to an access request signal received from each of the plurality of mobile terminals is satisfied, and wherein the predetermined condition is a procedure for checking whether the mobile terminal is pre-registered in the head unit.

14. The head unit according to claim 13, wherein the resource controller controls a resource comprising audio, video, and a microphone.

15. The head unit according to claim 14, wherein the resource controller excludes an occupation entity of the plurality of mobile terminals when an occupation entity of each resource is the head unit.

16. The head unit according to claim 15, wherein the resource controller excludes an occupation entity of remaining mobile terminals except for the head unit and a first mobile terminal of the plurality of mobile terminals when the occupation entity of each resource is the first mobile terminal.

17. The head unit according to claim 13, wherein the wherein the resource controller notifies a corresponding mobile terminal that the content requested to be changed is not the same as content reproduced by the corresponding occupied resource upon determining that the content requested to be changed is not the same as content reproduced by the corresponding occupied resource.

18. A streaming control method of a head unit for a vehicle, for providing a multi-streaming service between different devices, the method comprising:

recognizing a plurality of mobile terminals including separate first and second mobile terminals requesting access via short-range communication, by a terminal recognition unit;

receiving at least one content from the plurality of recognized mobile terminals, by a resource receiver;

exclusively occupying only one content in each resource within a control range for each respective content of at least one content, by a resource controller; and driving each content through each exclusively occupied resource, by a content driver, wherein the resource controller performs control simultaneously to reproduce one content of first type, transmitted from the first mobile terminal, by first resource, while another content of second type, transmitted from the second mobile terminal, is reproduced by second resource, simultaneously streams different content types from different mobile terminals concurrently, determines whether content requested to be changed is the same type as content reproduced by a corresponding occupied resource of one of the first mobile terminal and the second mobile terminal upon receiving a request for change in the content from a third mobile terminal, which does not occupy each resource, among the plurality of mobile terminals, changes the content of the corresponding occupied resource to the content requested to be changed and reproduces the corresponding resource under permission of an occupation entity upon determining that the content requested to be changed is the same type as the content reproduced by the corresponding occupied resource, and sets the mobile terminal that requests change in content as an occupation entity after the change and excludes occupation entities of mobile terminals different from the resource controller, wherein a streaming service of the content of the corresponding occupied resource is seamlessly converted to the content requested to be changed of the third mobile terminal, wherein the head unit permitting access of a plurality of mobile terminals, when a predetermined condition corresponding to an access request signal received from each of the plurality of mobile terminals is satisfied, and wherein the predetermined condition is a procedure for checking whether the mobile terminal is pre-registered in the head unit.

19. The method according to claim 18, wherein the exclusively occupying comprises controlling a resource comprising audio, video, and a microphone, by a resource controller.

20. The method according to claim 19, wherein the exclusively occupying comprises excluding an occupation entity of the plurality of mobile terminals when an occupation entity of each resource is a head unit.

21. The method according to claim 20, wherein the exclusively occupying comprises excluding an occupation entity of remaining mobile terminals except for a head unit and a first mobile terminal of the plurality of mobile terminals when the occupation entity of each resource is the first mobile terminal.

22. The method according to claim 18, wherein the driving comprises notifying a corresponding mobile terminal that the content requested to be changed is not the same as content reproduced by the corresponding occupied resource upon determining that the content requested to be changed is not the same as content reproduced by the corresponding occupied resource, by the resource controller.

23. A non-transitory computer readable medium for executing the streaming control method according to claim 18.

* * * * *